(12) United States Patent
Inoue

(10) Patent No.: US 6,331,231 B1
(45) Date of Patent: Dec. 18, 2001

(54) WEB TRANSFER BELT AND PRODUCTION PROCESS FOR THE SAME

(75) Inventor: Kenji Inoue, Ibaraqi-ken (JP)

(73) Assignee: Ichikawa Co., Ltd., Tokyo (JP)

( * ) Notice: Subject to any disclaimer, the term of this patent is extended or adjusted under 35 U.S.C. 154(b) by 0 days.

(21) Appl. No.: 09/652,092

(22) Filed: Aug. 31, 2000

(30) Foreign Application Priority Data

Sep. 20, 1999 (JP) .................................. 11-266386

(51) Int. Cl.[7] .................................. D21F 2/00; D21F 3/00
(52) U.S. Cl. ...................... 162/358.4; 162/306; 162/901; 442/77; 442/221
(58) Field of Search ..................................... 162/145, 146, 162/202, 205, 348, 358.1, 358.2, 358.4, 900, 901, 902, 903, 904, 306; 139/383 A; 428/221, 222, 223, 304.4; 442/59, 76, 77, 181, 221

(56) References Cited

U.S. PATENT DOCUMENTS

| 3,353,981 | * | 11/1967 | Jacob | 442/136 |
| 4,226,906 | * | 10/1980 | Jacob | 428/283 |
| 4,483,745 | | 11/1984 | Wicks et al. | 162/205 |
| 4,552,620 | * | 11/1985 | Adams | 162/358.4 |
| 4,701,368 | * | 10/1987 | Kiuchi et al. | 442/226 |
| 4,772,504 | * | 9/1988 | Andresen | 428/96 |
| 4,830,905 | * | 5/1989 | Gulya et al. | 428/234 |
| 5,298,124 | | 3/1994 | Eklund et al. | 162/306 |
| 5,549,968 | * | 8/1996 | Byers et al. | 428/241 |
| 6,136,151 | * | 10/2000 | Davenport et al. | 162/306 |

FOREIGN PATENT DOCUMENTS

A-94-57678  3/1994 (JP) .................................. D21F/3/00

* cited by examiner

Primary Examiner—Peter Chin
Assistant Examiner—Eric Hug
(74) Attorney, Agent, or Firm—Duane Morris & Heckscher LLP

(57) ABSTRACT

The invention provides a web transfer belt, having good paper releasability, that can be produced with ease and at a low cost without increasing either its hardness or its weight, and a production process therefor. In one embodiment, the web transfer belt includes a high-molecular weight elastic member formed using a resin material mixed with microcapsules (alternatively, closed bubbles or closed bubbles created by a foaming agent), and having a web-receiving face for receiving a web P thereon to transfer, at whose web-receiving face there are provided a multitude of recesses having cut-openings of the microcapsules, such that a water film W easy to be formed between the web-receiving face and the web P can be broken by a large number of recesses.

6 Claims, 6 Drawing Sheets

WEB TRANSFER BELT AND PRODUCTION PROCESS FOR THE SAME

FIELD OF THE INVENTION

The present invention relates to a web transfer belt adapted to easily break a water film formed between a web-receiving face and a web, and a production process for the same.

BACKGROUND OF THE INVENTION

As is well known to those skilled in the paper-making art, a web is dewatered by a pressing pressure applied in a press section of a paper-making machine. For example, it is known in the prior art to provide a web pressure-dewatering means and web transfer means, in the pressure section of a paper-making machine, in the form of a combination of a pair of press rolls with a pair of needled felts therebetween. More recently, a variety of means for imparting pressure onto a web have been provided with a combination of a single press roll and a shoe in order to improve the dewatering efficiency through an increase in the nip width, under application of a pressure, on the web. One example of the latter combination is known as a shoe-press assembly, whose simplified construction is illustrated in FIG. 7(a)

Referring to the prior art arrangement shown in FIG. 7(a), a shoe press assembly 20 includes a press roll 21 and a shoe 22, wherein the shoe 22 is shaped so as to conform to the press roll 21 along its circumference. In this way a nip width N under an applied nip pressure is large when compared to an arrangement employing a pair of press rolls. A shoe-press belt 23, that is constructed of a high-molecular elastic member, e.g., such as urethane, and a base cloth layer, runs between press roll 21 and shoe 22. A web P runs between shoe-press belt 23 and press roll 21, so as to be sandwiched between upper and lower needled felts 24 and 25. As a consequence, web P is press-dewatered, under the nip-pressure produced between press roll 21 and shoe 22, with the squeezed-out water migrating into upper and lower needled felts 24 and 25.

In this situation, however, as the water migrates into the upper and lower needled felts 24 and 25, they expand in sections where the felts are relieved of the nip pressure. As a result, the water accumulated in felts 24 and 25 actually migrates back into web P, by capillary action, thus rewetting the paper and causing a reduction in the efficiency of the dewatering process.

In order to solve the rewetting problem, a shoe press assembly 20', as illustrated in the prior art arrangement shown in FIG. 7(b), has been proposed, and which is disclosed in U.S. Pat. No. 4,483,745. In the shoe press assembly 20', a web P is sandwiched between a single needled felt 24 and a shoe press belt 23 and dewatered under application of a nip pressure produced by a press roll 21 and a shoe 22, such that the squeezed-out water migrates into needled felt 24. This arrangement still rewets the paper, since even though needled felt 24 is only a single piece, a portion of the water absorbed in sections of the felt having lower applied pressure still migrates back to the web.

Also in the prior art arrangement shown in FIG. 7(b), the web P of shoe-press assembly 20' and received on shoe press belt 23 has suffered from difficulties associated with paper transfer to and reception by a next step in the process. In particular, the surface of shoe press belt 23 is often highly polished so as to be very smooth. As a result, a water film of a uniform thickness is produced in a clearance between shoe press belt 23 and web P, whereby web P strongly adheres to shoe press belt 23 in the presence of the water, resulting in very poor paper release.

As a technique to improve the paper release, two concepts have recently been proposed. A first one, as illustrated in the prior art arrangement shown in FIG. 8(a), is a shoe press belt 23 having a web-receiving face 26b, and on the surface of which are formed many of protrusions 27. A second one, as illustrated in the prior art arrangement shown in FIG. 8(b), is a shoe press belt 23 also having a web-receiving face, and on the surface of which are formed many of recesses 28'. The first one, as illustrated in the prior art arrangement shown in FIG. 8(a), is a technique disclosed in Japanese patent document JP-A-94-57678. In this prior art technique particulate filler 27, such as kaolin clay, inorganic material, polymer material and metal, which have a higher hardness than a high-molecular weight elastic member 26, is mixed into the high-molecular weight elastic member 26, reinforced by a base member 26a, and a web-receiving face 26b is polished to make particles of the particulate filler 27 protrude from the surface of the web-receiving face 26b, thus producing many of protrusions 27' on web-receiving face 26b. The protrusions 27' function to break-up the water film that is easily formed between web P and web-receiving face 26b, thus decreasing the adhesive force between web P and web-receiving face 26b of shoe press belt 23. This result in the web being transferred to or received by a next step in the process with ease.

The second one, as illustrated in the prior art arrangement shown in FIG. 8(b), is a technique disclosed in U.S. Pat. No. 4,552,620. This technique is such that when a high-molecular weight elastic member 26, that is reinforced by a base member 26a, is formed, a portion of the upper surface of the base member 26a is spray coated so that many of closed isolated bubbles 28 are formed. High-molecular weight elastic member 26 and a web-receiving face 26b are then polished so as to form a very large number of recesses 28' by the opening of the originally closed bubbles 28, at the surface. The recesses 28' function to break the water film that is formed between web P and web-receiving face 26b, and also decrease the adhesive force between web P and web-receiving face of the belt 23, such that the web is transferred to and received by a next step in the process with ease.

However, in order to attain the above-described effect, it is required to mix particulate filler 27 into a high-molecular weight elastic member 26 at a content ranging from 30 to 40 percent weight (wt %). Particulate filler 27 is harder than the high-molecular weight elastic resin so that belt 23 itself comes to have a high hardness, which results in easy cracking, especially at edge portions of a shoe, thereby decreasing the durability of the belt. In addition, since particulate filler 27 is mixed in the range of 30 to 40 wt % in content, the weight of belt 23 increases, which is problematic to operations, such as, looping belt 23 over in a shoe press assembly.

In addition, many hours are required to manufacture a high-molecular weight elastic member into which closed bubbles are mixed by, e.g., spray jetted synthetic resin. Also, closed bubbles once formed in the synthetic resin mass disappear over time due to fluidity of the resin resulting from conventional spraying methods. Thus, while there is a need to raise the viscosity of the sprayed resin, as the viscosity of the spraying resin is higher, spraying of the resin in a stable manner is harder to achieve and patches of coating are produced more easily, with the result that many kinds of problems such as unevenness of bubble size occur.

OBJECTS AND SUMMARY OF THE INVENTION

The present invention solves the foregoing and other problems associated with the prior art. Accordingly, it is an object of the present invention to provide a web transfer belt having good paper releasability, and that can be produced with ease and at a low cost without increasing either its hardness or weight, and to provide a production process for the same.

In order to achieve the above described object, a web transfer belt and production process for the same are provided comprising a high-molecular weight elastic member formed using a resin material mixed with microcapsules, and having a web-receiving face for receiving a web thereon to transfer, upon which web-receiving face there are provided a multitude of recesses formed by the cut-openings of the microcapsules, such that a water film formed between the web-receiving face and the web will be broken by the multitude of recesses.

In one embodiment of the web transfer belt, a high-molecular weight elastic member formed from a resin material mixed with closed bubbles, and having a web-receiving face for receiving a web thereon to transfer, upon which web-receiving face there are provided a multitude of recesses formed from the closed bubbles, such that a water film formed between the web-receiving face and the web will be broken by the multitude of recesses.

In another embodiment of the web transfer belt, a high-molecular weight elastic member is formed from a resin material mixed with a foaming agent. The high-molecular weight elastic member having a web-receiving face for receiving a web thereon to transfer, upon which web-receiving face there are provided a multitude of recesses being formed from the closed bubbles created by action of the foaming agent, such that a water film formed between the web-receiving face and the web can be broken by the multitude of recesses.

A production process for a web transfer belt according to the invention comprises a first step of mixing microcapsules into a resin material; a second step of forming a high-molecular weight elastic member having a web-receiving face for receiving a web thereon to transfer, and including the resin material mixed with the microcapsules; and a third step of exposing a multitude of recesses by creating cut-openings of the microcapsules at the web-receiving face, so as to form a web transfer belt capable of breaking a water film formed between the web-receiving face and the web.

An alternative production process for a web transfer belt according to the invention comprises a first step of mixing closed bubbles into a resin material; a second step of forming a high-molecular weight elastic member having a web-receiving face for receiving a web thereon to transfer, and including the resin material mixed with the closed bubbles; and a third step of creating a multitude of recesses from the closed bubbles at the web-receiving face, so as to form the web transfer belt having a function to make it possible to break a water film formed between the web-receiving face and the web.

In an other alternative production process for a web transfer belt according to the invention, a first step of mixing a foaming agent into a resin material; a second step of forming a high-molecular weight elastic member having a web-receiving face for receiving a web thereon to transfer, and including the non-processed resin material mixed with the foaming agent; and a third step of exposing an very large number of recesses by cutting the closed bubbles created by action of the foaming agent at the web-receiving face, so that the web transfer belt is capable of breaking a water film formed between the web-receiving face and the web.

DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein.

Figure 1:
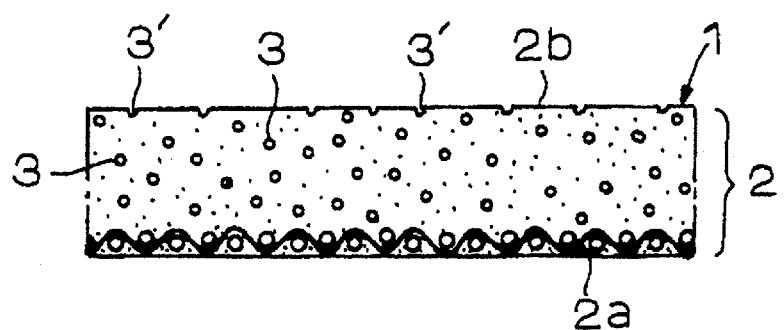
FIG. 1 is a cross-sectional view of a web transfer belt formed according to the present invention.
Figure 2:
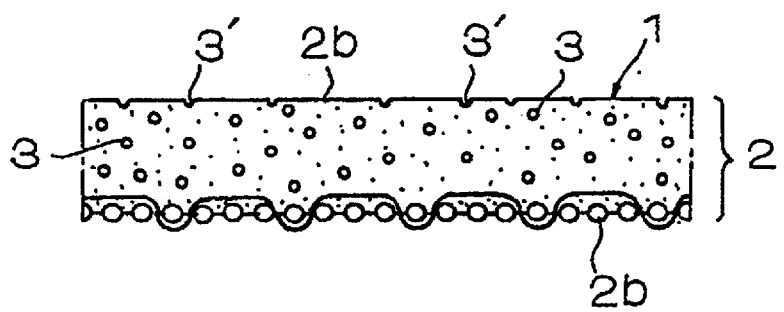
FIG. 2 is a cross-sectional view showing of another embodiment of a web transfer belt formed according to the present invention.

Additionally, the following cross-reference listing of the reference numerals and characters, and their associated parts of the invention is provided to aid in the understanding of the present disclosure.

1—web transfer belt of the present invention;
2—high-molecular elastic member;
2*a*—base member;
2*b*—web-receiving face;
3—surface layer forming member;
3'—infinite number of recesses;
11—synthetic resin tank;
12—agitator;
13,14—metal roll;
15—pump;
16—traverse mechanism;
17—nozzle;
18—single roll production machine;
20—shoe press assembly;
20'—shoe press assembly;
21—press roll;
22—shoe;
23—shoe press belt;
24—upper needled felt;
25—lower needled felt;
'26—high-molecular elastic member;
26*a*—base member;
26*b*—web-receiving face;
27—particulate filler;
27'—recess;
28—closed bubble;
28'—recess;
W—water film;
P—web;
N—nip width.

DETAILED DESCRIPTION OF THE PREFERRED EMBODIMENT

This description of preferred embodiments is intended to be read in connection with the accompanying drawings, which are to be considered part of the entire written description of this invention. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Referring to FIG. 1, a web transfer belt 1 formed in accordance with one embodiment of the invention comprises a high-molecular weight elastic member 2 that is reinforced by a base member 2a, and includes a web-receiving face 2b for receiving the web thereon to transfer, and a plurality of microcapsules 3 that are mixed into the high-molecular weight member 2. While web-receiving face 2b of high-molecular weight elastic member 2 is formed by polishing the high-molecular weight elastic member 2, cut-openings of the microcapsules 3 are exposed in a dispersing manner at the web-receiving face 2b and the exposed cut-openings constitute a very large number of recesses 3'.

A non-processed resin material of the high polymer molecule elastic member 2 can be selected from the group of polymers comprising rubber or elastomer, and is preferably a polyurethane resin. When selecting a polyurethane resin, a thermoset urethane resin is preferable for its physical properties and the thermoset resin may most preferably be selected in the range of from 70 to 98° (JIS-A) in hardness.

For example, base member 2a (FIG. 1) may be a woven fabric of a 1/1 single weave design, made from warp yarns and weft yarns each of nylon multi-filaments or the like; or a woven fabric of a modified 1/3 single weave design, made from warp yarns and weft yarns each of the same multi-filaments or the like; or other fabrics such as a needled felt with a fabric as a support. It should be noted that the base member 2a is preferably used in a endless form in terms of strength.

Microcapsules 3 may be selected to be any of the known hollow members that are intended for mixing into synthetic resin. A size for microcapsules 3 is preferably 1 mm or less in diameter, and most preferably smaller than 1 mm in diameter. The selected diameter of microcapsules is critical inasmuch as, if the diameter of the microcapsules is 1 mm or more, it is possible that an impression of the pattern formed by the cut-capsules will be transferred onto the web. The mixing ratio of microcapsules 3 to resin can be varied according to a non-processed material in a proper manner. In any case, however, it has been confirmed by experiment that if an excessive mixing ratio of microcapsules 3 raises the viscosity of a non-processed resin beyond an allowable limit, preservation of the required durability of the web transfer belt becomes to be difficult. Therefore, it is necessary to closely monitor these factors when forming a belt according to the present invention.

Figure 3:
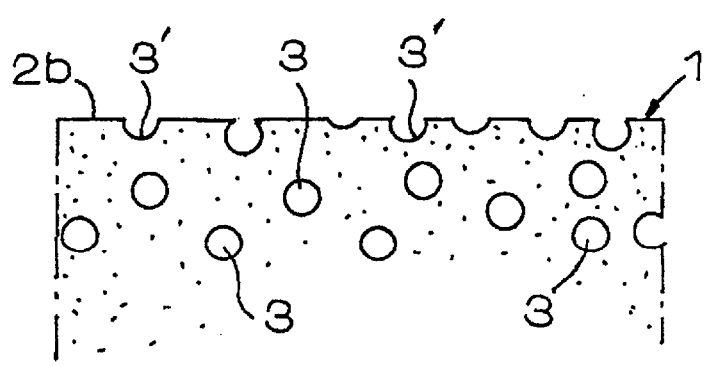
FIG. 3 is an enlarged cross-sectional view of recesses provided at a web-receiving face of the web transfer belt of the present invention.

A cut-opening of the microcapsule (FIG. 3) forms recesses 3' with various depths on the surface of web-receiving face 2b. While a ratio in area of the recesses in total to the surface is properly selected according to the type and quality of paper to be produced, the ratio is preferably in the range of from 5 to 60 percent relative to the total surface area of web-receiving face 2b. It has also been confirmed by the experiment that if the ratio is less than the lower limit of the forgoing range or more than the upper limit much less than desirable results are achieved.

Since microcapsules 3 are hollow, their inclusion in a non-processed resin material of the high-molecular weight member 2 will not appreciably increase the weight of web transfer belt 1 of the present invention. In addition, since the introduction of many microcapsules 3 in the non-processed resin material, a significant and advantageous increase in elasticity of the high-molecular weight elastic member 2 may be provided resulting in a belt structure that exhibits great resistance to cracking.

Figure 4:
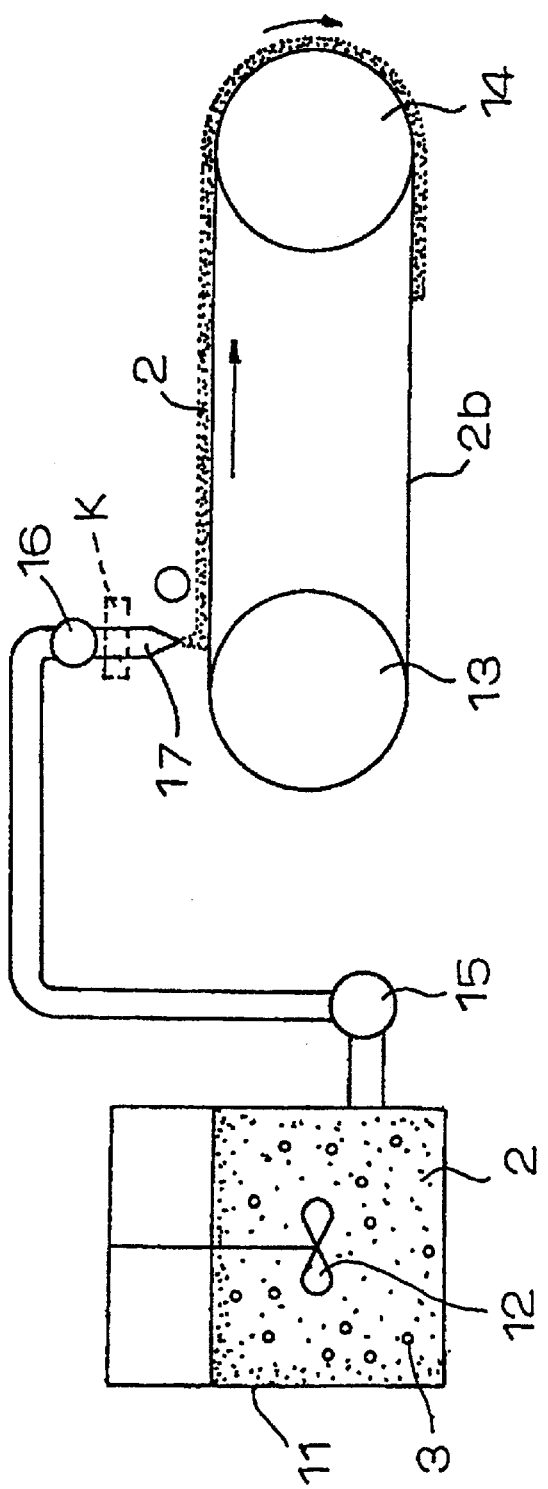
FIG. 4 is a schematic side view of an apparatus for forming a web transfer belt according to the present invention.

Referring to FIG. 4, in one embodiment of the production process for a web transfer belt 1 according to the present invention, microcapsules 3 are mixed into a non-processed resin material of a high-molecular weight elastic member 2. This first step is performed within a resin tank 11 to prepare a mixture. Of course it will be understood that the mixture may be prepared in a different place and brought to the site of manufacture. A mixed amount of microcapsules 3 in the non-processed resin material is sufficient to be on the order of about 1 wt %. Microcapsules 3 are then uniformly dispersed by an agitator 12 equipped in the resin tank 11.

Figure 5:
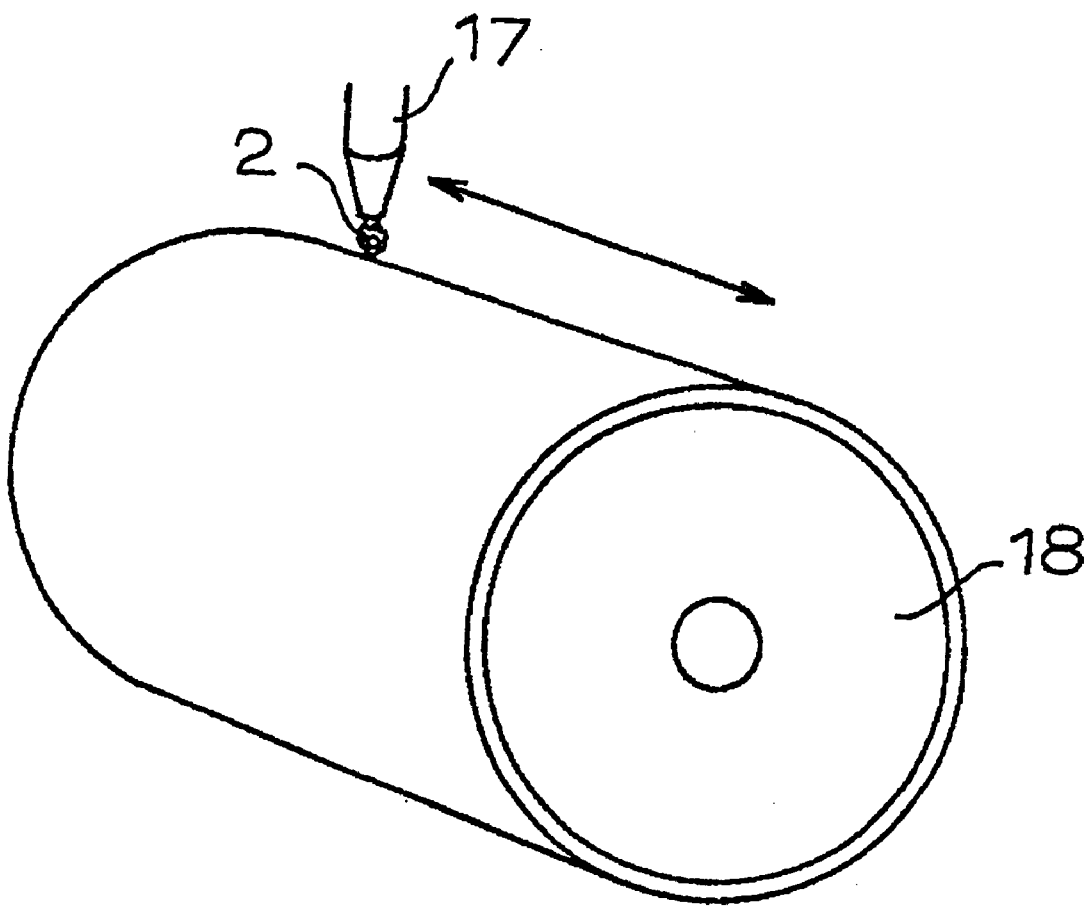
FIG. 5 is a schematic, perspective view of a portion of an apparatus for forming a web transfer belt according to the present invention.

Next, a base member 2a that is made of a woven fabric or the like is looped around two rolls 13 and 14 at a constant tension. The non-processed resin material having been mixed with the microcapsules 3, and still being in a processable form in resin tank 11, is drawn out by a pump 15 and coat impregnated onto base member 2a, via moving a nozzle 17 in a transverse direction by means of a traversing mechanism 16 (FIG. 5). As a result of this process, there is formed a high-molecular weight elastic member 2 having a web-receiving face 2b for receiving the web thereon to transfer.

After the coat impregnation step, high-molecular weight elastic member 2 is left for a time with nothing done thereon or heat cured by a heating apparatus (not shown). Thereafter, high-molecular weight elastic member 2 is cured, and then polished by a conventional polishing machine (not shown) in order to achieve uniformity of a belt thickness and a smooth surface of the web-carrying surface 2b. Advantageously, the polishing acts to cut a plurality of microcapsules that are embedded in the belt, thereby exposing a very large number of recesses 3' that result from the polish-cut-openings of microcapsules 3 at the surface of web-receiving face 2b. The resulting web transfer belt according to the present invention comprises a web-receiving face 2b having a very large number of recesses 3' formed thereon by the polish-cut-openings of the plurality of microcapsules 3.

It should be noted that in a second step, for example, an alternative process may be adopted as follows. A non-processed resin material, that has not had microcapsules introduced into it, is coat impregnated onto one side of a base member 2a and the non-processed resin that is impregnated into the base member 2a is cured. Thereafter, a back surface of a needled felt 4 is polished off to form a surface contacting a shoe 21 of a shoe press assembly 20. Then, the inside and outside of the base member are inverted. The non-processed resin material of the high-molecular weight elastic member 2 is then coat impregnated onto the outer side of the base member 2a after the inversion and the non-processed resin material impregnated onto the base member 2a is cured to form high-molecular weight elastic member 2 having a web-receiving face 2b. Thereafter, a front surface of the base member 2a is polished off to expose a very large number of recesses 3' having polish-cut-openings of microcapsules 3 at the web-receiving face, thereby producing the web transfer belt 1 of the present invention.

In another alternative embodiment, and referring to FIG. 5, a small diameter shoe press belt is produced as a web transfer belt 1 according to the present invention. In this embodiment, base member 2a is wound around a single role 18. When the winding start and finish ends of the base member 2a meet, they are butt-joined with each other. Next, a non-processed resin material is mixed with microcapsules, and then in accordance with the foregoing first step, is coat impregnated onto base member 2a, wound around a surface of single metal roll 18 from a nozzle 17 by traversing the nozzle 17 in a transverse direction using a traversing mechanism. A pump from a resin tank (not shown) is used with the result that there is formed a high-molecular weight elastic member 2 having a web-receiving face 2b for receiving the web thereon to transfer.

Thereafter, high-molecular weight elastic member 2 is left for a time with nothing done thereon, or heat cured by a heating means (not shown). Web-receiving face 2b of high-molecular weight elastic member 2 is then polished to expose a very large number of recesses 3' having polish-cut-openings of microcapsules 3 at the surface thereof. In this way, a small diameter web transfer belt according to the present invention is formed upon which web-receiving face 2b includes a very large number of recesses 3'.

It should be noted that in the foregoing embodiment, microcapsules 3 are mixed into the non-processed resin material, high-molecular weight elastic member 2 has a web-receiving face 2b, and web-receiving face 2b is polished to form a very large number if recesses 3' having polish-cut-openings of microcapsules 3. In an alternative process the very large number of recesses 3' are formed using materials other than microcapsules 3.

That is, closed bubbles (not shown) can be mixed into the high-molecular weight elastic member 2 instead of microcapsules 3 to form a very large number of recesses 3'. The closed bubbles are already in member 2, at the surf ace of web-receiving face 2b. Mixing of closed bubbles into high-molecular weight member 2 can be effected with a bubble mixer K (shown in phantom) equipped upstream of nozzle 17 in FIG. 4.

Bubble mixer K takes in ambient air and mixes the air into the non-processed resin material. The prepared bubble-mixed resin is then coated on base member 2a through nozzle 17 to form high-molecular weight elastic member 2 with bubbles of a desired size included therein. Thereafter, high-molecular weight elastic member 2 is left to be cured and the cured member 2 is polished on web-receiving face 2b so as to expose a very large number of recesses (formed by cutting through successive bubbles already in the member 2) thereby achieving a web transfer belt according to the present invention.

Further, as an alternative process, a foaming agent may be mixed into a non-processed resin material. More particularly, the non-processed resin material that has been mixed with the foaming agent is used to form a high-molecular weight elastic member 2 having a web-receiving face 2b for receiving a web thereon to transfer, and then a very large number of recesses 3' (formed by action of the foaming agent in the member 2) are exposed at web-receiving face 2b, thereby producing a web transfer belt according to the present invention. In this embodiment, the non-processed resin material is mixed with a foaming agent and controlled so as to produce closed bubbles therein. After coating of the non-processed resin material mixed with a foaming agent, high-molecular weight elastic member 2 is cured after conclusion of the foaming reaction. Polishing of a surface of the high-molecular weight elastic member is carried out, the surface being a web-receiving face, to expose a very large number of recesses.

It should be noted that not only with the recesses originating from the mixed-in closed bubbles, but also with the recesses originating from the created bubbles as well, a size of bubbles is preferably 1 mm or less in diameter, similar to the case where microcapsules 3 are employed to form the recesses. Likewise, a ratio of recesses relative to the surface of web-receiving face 2b is preferably in the range of from about 5 to 60 percent. It is needless to say that the ratio is properly selected according to the kind and quality of paper to be made.

Figure 6A:
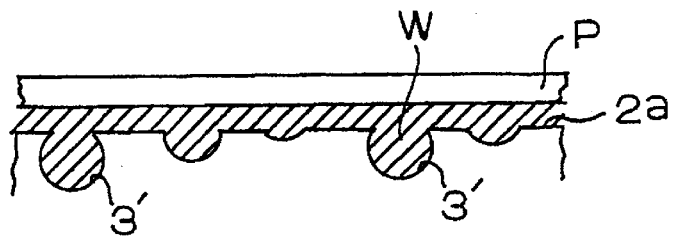
FIGS. 6(*a*) to 6(*d*) are schematic illustrations showing various aspects of a web transfer belt formed according to one embodiment of the present invention.
Figure 6B:
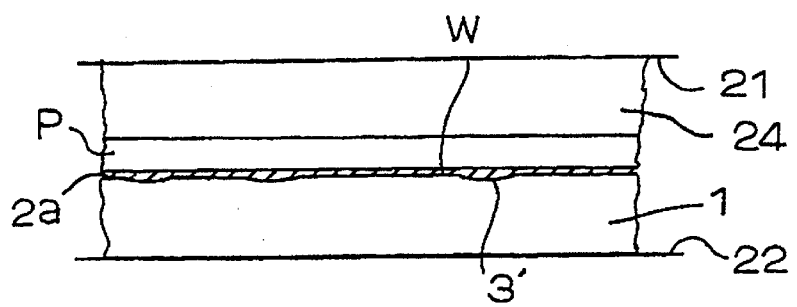
Figure 6C:
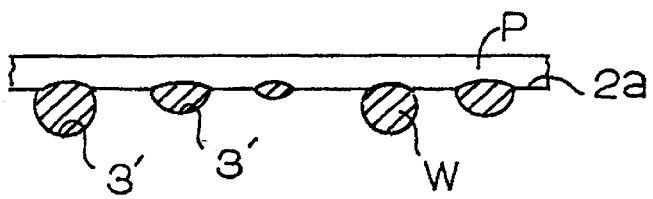

Description will be made of actions of the web transfer belts 1 obtained by the above described process based on FIGS. 6(a) to 6(d). FIGS. 6(a) to 6(c) are partially cutaway enlarged sectional views in sequential steps. It should be noted that web transfer belt 1 of the present invention may be used in a conventional shoe press assembly 20' as shown in FIG. 7(b). That is, it is a belt to transfer web P together with a felt 24 while sandwiching web P, in a nip section, between a press roll 21 and a shoe 22 opposed to the press roll 21.

FIG. 6(a) shows a state of a web transfer belt 1 of the present invention on which web P, containing water produced in a previous step such as a wire loop section, is received. In this state, water coming out from web P forms a water film W between web-receiving face 2b and web P and therefore, web-receiving face 2b and web P strongly adhere to each other with the assistance of water film W.

FIG. 6(b) shows a state of web P, sandwiched between web transfer belt 1 of the present invention and felt 24, under application of a nip pressure produced by press roll 21 and shoe 22. In the state in which a pressure is applied by press roll 21 and shoe 22, a very large number of recesses 3' having cut-openings of microcapsules 3 or the like are deformed flat due to elasticity of high-molecular weight elastic member 2, thereby forcing water squeezed out from web P to migrate into felt 24.

FIG. 6(c) shows a state of web P sandwiched between web transfer belt 1 of the present invention and felt 24 having passed through a section under application of the nip pressure between press roll 21 and shoe 22. At the exit of the section under application of the nip pressure, web-receiving face 2b restores to its original shape, due to elasticity of high-molecular weight elastic member 2. The water between web P and web-receiving face 2b in this state enters recesses 3' to fill by a pressure difference between recesses 3' and peripheral portions thereof when recesses 3' (that were previously flat) restore to their original volumes and shapes. In the course of restoration of the flat recesses to their original shapes, water in the peripheral portions is also drawn into recesses 3' and condensed therein by action of the water already entering recesses 3'. The result is that patches of water film W caused by breakage of an otherwise extended water film are formed between web P and web-receiving face 2b.

The very large number of recesses 3', having the cut-openings of the microcapsules 3 formed at web-receiving face 2b or the like, is preferably of 1 mm or less in the maximum diameter, and recesses 3' of a diameter of this order have been confirmed to impart no influence on the surface finish of a paper product, even when recesses 3' on web-receiving face 2b are forced to reduce volumes of their own into a flat shape under a nip pressure applied.

Figure 6D:
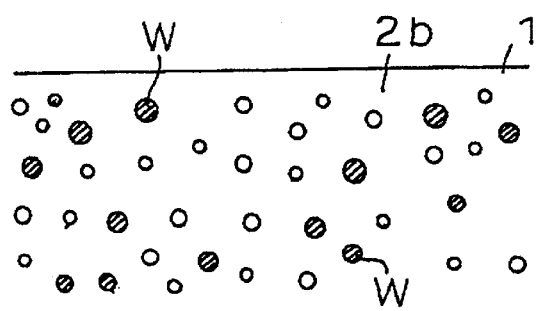
Figure 7A:
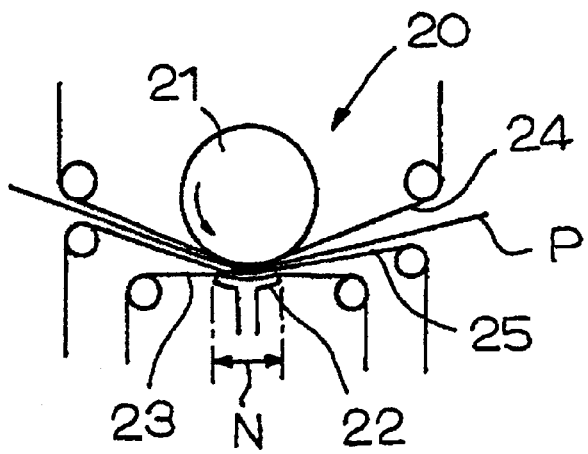
FIGS. 7(*a*) and 7(*b*) illustrate prior art shoe press assemblies.
Figure 7B:
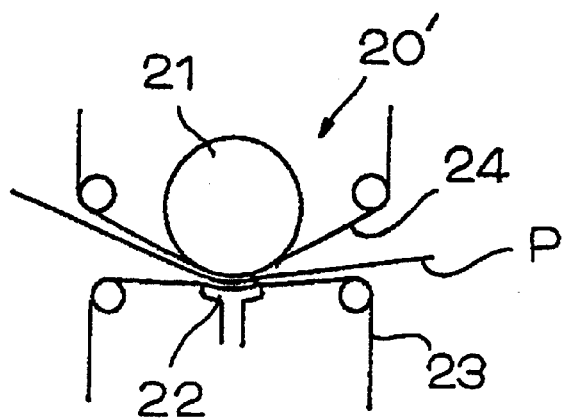
Figure 8A:
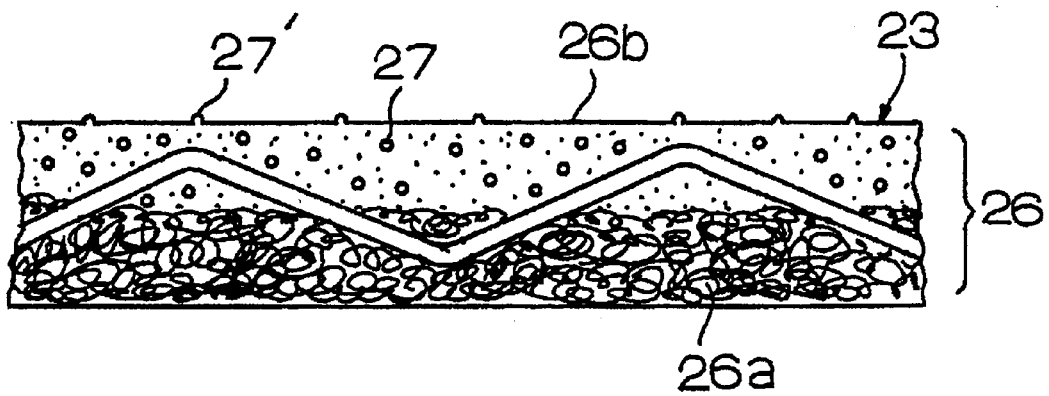
FIGS. 8(*a*) and 8(*b*) are illustrations showing respective prior art shoe press belts, wherein FIG. 8(*a*) is a belt having a web-receiving face including many protrusions, and FIG. 8(*b*) is a belt having a web-receiving face including many of recesses.
Figure 8B:
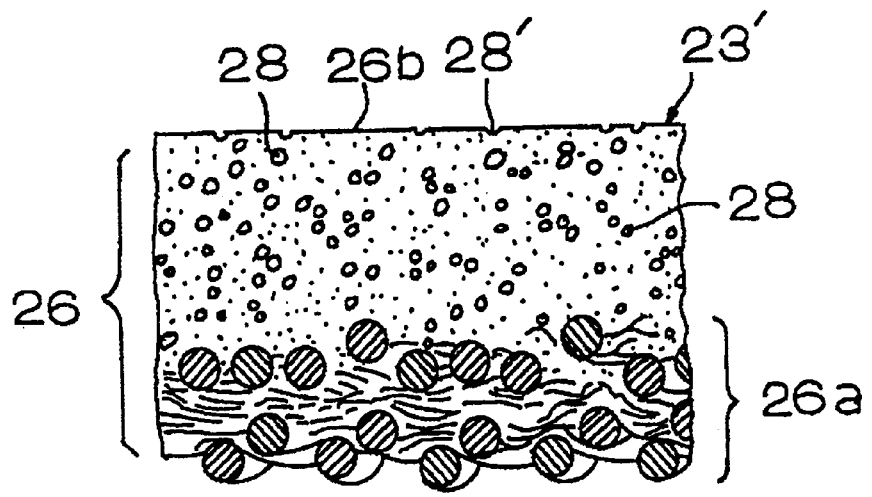

As has been described above, the patches of water film W produced through breakage of an otherwise extended water film are in a dispersed state, as shown in FIG. 6(d) when viewing web-receiving face 2b of web transfer belt 1 of the present invention from above. Therefore, since web-receiving face 2b of web transfer belt 1 and web P are transferred to and received by a next step in the process in a state where no strong adhesion is present therebetween, excellent paper releasability and very smooth transfer and reception are provided by the invention.

EXAMPLE

A woven fabric (of a thickness of 1 mm) of a modified 1/3 single weave design, made from warp yarns and weft yarns of nylon multi-filaments of a size of 4500 denier in an endless form is spanned between two rolls as a base member 2a under tension and a non-processed resin material is coated on base member 2a through a nozzle 17. As the non-processed resin material for coating, thermoset polyurethane resin with a hardness of 86 degrees (JIS-A) is used and the microcapsules 3 are mixed into the resin at a content of 1 wt % and the resin is agitated in tank 11 to attain a uniformly dispersed state in advance to the coating.

Microcapsules 3 comprise a plurality of substantially hollow spheres that are readily available for dedicated use in thermoset polyurethane resin. A preferred diameter is used in the range of from about 20 to 40 $\mu$m. The non-processed resin material is coated and impregnated on and into base member 2a so as to not only reach down to a depth of about half a thickness of base member 2a, but so as to build up to a predetermined thickness thereon.

After the coating is over, heat is applied by a conventional heater (not shown) to cure the non-processed resin material and form a high-molecular weight elastic member 2. A web-receiving face 2b of high-molecular weight elastic member 2 is polished (ground) by a polishing machine. In this example, the polishing is performed until a thickness of high-molecular weight elastic member 2 above the top surface of base member 2a reaches about 1 mm so as to produce a web transfer belt 1 according to the present invention with a total thickness of about 2 mm.

It should be noted that the time from the start of coating with a non-processed resin material to finish of curing of high-molecular weight elastic member 2 is about 12 hours. Therefore, according to the present invention, it is confirmed that a web transfer belt 1 with excellent effects is able to be produced in a short time.

Likewise, while web transfer belts 1 of the present invention are manufactured as trials using non-processed resin materials mixed with closed bubbles or a foaming agent, times consumed between start of coating the non-processed resin materials and finish of curing of the resin materials of high-molecular weight elastic members 2 were almost the same as one another.

As described above, a web transfer belt 1 relating to the present invention includes: a high-molecular weight elastic member formed using a resin material mixed with microcapsules, and having a web-receiving face for receiving a web thereon to transfer, upon which web-receiving face there are provided a multitude of recesses having cut-openings of microcapsules, such that a water film formed between the web-receiving face and the web can be broken by the very large number of recesses, and good transfer and reception of the web to and by a next step in the process are ensured. In addition, there is no increase in total weight, hardness and so on of the belt due to mixing of the microcapsules, thereby exerting various excellent effects in that no cracking or the like occurs during operation.

An alternative embodiment of web transfer belt relating to the invention includes: a high-molecular weight elastic member formed using a resin material mixed with closed bubbles, and having a web-receiving face for receiving a web thereon to transfer, upon which web-receiving face there are provided a multitude of recesses being originally closed bubbles, such that a water film formed between the web-receiving face and the web can be broken by the recesses and good transfer and reception of the web to and by a next step in the process are ensured. In addition, there is no increase in total weight, hardness and so on of the belt due to mixing of the closed bubbles, thereby exerting various excellent effects in that no cracking or the like occurs during operation.

A further alternative embodiment of a web transfer belt relating to the invention includes: a high-molecular weight elastic member formed using a resin material mixed with a foaming agent, and having a web-receiving face for receiving a web thereon to transfer, upon which web-receiving face there are provided a multitude of recesses being originally closed bubbles created by action of the foaming agent, such that a water film formed between the web-receiving face and the web can be broken by the recesses and good transfer and reception of the web to and by a next step of the process are ensured. In addition, there is no increase in total weight, hardness and so on of the belt due to mixing of the closed bubbles created by action of the foaming agent, thereby exerting various excellent effects in that no cracking or the like occurs during operation.

An embodiment of a production process for a web transfer belt relating to the invention includes: a first step of mixing microcapsules into a resin material; a second step of forming a high-molecular weight elastic member having a web-receiving face for receiving a web thereon to transfer using the non-processed resin material mixed with the microcapsules; and a third step of exposing a multitude of recesses having cut-openings of the microcapsules at the web-receiving face, such that an excellent effect is exerted in that there can be easily produced the web transfer belt having a function to make it possible to break a water film formed between the web-receiving face and the web, only by using the resin mixed with the microcapsules as the non-processed resin material.

A further embodiment of production process for a web transfer belt relating to the invention includes: a first step of mixing closed bubbles into a resin material; a second step of forming a high-molecular weight elastic member having a web-receiving face for receiving a web thereon to transfer using the non-processed resin material mixed with the closed bubbles; and a third step of exposing a multitude of recesses being originally closed bubbles at the web-receiving face, such that an excellent effect is exerted in that there can be easily produced the web transfer belt having a function to make it possible to break a water film easy to be formed between the web-receiving face and the web, only by using the resin mixed with the closed bubbles as the non-processed resin material.

Another embodiment of production process for a web transfer belt includes: a first step of mixing a foaming agent into a resin material; a second step of forming a high-molecular weight elastic member having a web-receiving face for receiving a web thereon to transfer using the non-processed resin material mixed with the foaming agent; and a third step of exposing a multitude of recesses being originally closed bubbles created by action of the foaming agent at the web-receiving face, such that an excellent effect is exerted in that there can be easily produced a web transfer belt having a function to make it possible to break a water film formed between the web-receiving face and the web, only by using the resin mixed with the closed bubbles created by action of the foaming agent as the non-processed resin material.

It is to be understood that the present invention is by no means limited only to the particular constructions herein disclosed and shown in the drawings, but also comprises any modifications or equivalents within the scope of the claims.

What is claimed is:

1. A web transfer belt comprising: a high-molecular weight elastic member formed using a resin material mixed with microcapsules, and having a web-receiving face for receiving a web thereon to transfer, upon which web-receiving face there are provided a multitude of recesses having cut-openings of microcapsules, whereby water film to be formed between said web and web-receiving face may be broken by flattening of said web-receiving face under nip pressure and restored at the release of said nip pressure.

2. A web transfer belt comprising: a high-molecular weight elastic member formed using a resin material mixed with closed bubbles, and having a web-receiving face for receiving a web thereon to transfer, upon which web-receiving face there are provided a multitude of recesses formed from initially closed bubbles, whereby water film to be formed between said web and web-receiving face may be broken by flattening of said web-receiving face under nip pressure and restored at the release of said nip pressure.

3. A web transfer belt comprising: a high-molecular weight elastic member formed using a resin material mixed with a foaming agent, and having a web-receiving face for receiving a web thereon to transfer, upon which web-receiving face there are provided a multitude of recesses formed from initially closed bubbles created by action of the foaming agent, whereby water film to be formed between said web and web-receiving face may be broken by flattening of said web-receiving face under nip pressure and restored at the release of said nip pressure.

4. A production process for a web transfer belt comprising: a first step of mixing microcapsules into a resin material; a second step of forming a high-molecular weight elastic member having a web-receiving face for receiving a web thereon to transfer using the resin material mixed with the microcapsules; and a third step of exposing a multitude of recesses having cut-openings of the microcapsules at the web-receiving face, such that whereby water film to be formed between said web and web-receiving face may be broken by flattening of said web-receiving face under nip pressure and restored at the release of said nip pressure.

5. A production process for a web transfer belt comprising: a first step of mixing closed bubbles into a resin material; a second step of forming a high-molecular weight elastic member having a web-receiving face for receiving a web thereon to transfer using the resin material mixed with the closed bubbles; and a third step of exposing a multitude of recesses being originally closed bubbles at the web-receiving face, such that whereby water film to be formed between said web and web-receiving face may be broken by flattening of said web-receiving face under nip pressure and restored at the release of said nip pressure.

6. A production process for a web transfer belt comprising: a first step of mixing a foaming agent into a resin material; a second step of forming a high-molecular weight elastic member having a web-receiving face for receiving a web thereon to transfer using the resin material mixed with the foaming agent; and a third step of exposing a multitude of recesses being originally closed bubbles created by action of the foaming agent at the web-receiving face, such that whereby water film to be formed between said web and web-receiving face may be broken by flattening of said web-receiving face under nip pressure and restored at the release of said nip pressure.

* * * * *